US006957081B2

(12) United States Patent
Leyh et al.

(10) Patent No.: US 6,957,081 B2
(45) Date of Patent: Oct. 18, 2005

(54) MULTI-MODE MOBILE COMMUNICATIONS DEVICE WITH CONTINUOUS MODE TRANSCEIVER AND METHODS THEREFOR

(75) Inventors: Arthur Christopher Leyh, McHenry, IL (US); David Haub, Lake In The Hills, IL (US); Louis Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 173 days.

(21) Appl. No.: 10/027,650

(22) Filed: Dec. 21, 2001

(65) Prior Publication Data

US 2003/0119547 A1 Jun. 26, 2003

(51) Int. Cl.[7] .............................................. H04M 1/00

(52) U.S. Cl. ..................... 455/553.1; 455/82; 455/132; 455/550.1; 455/552.1; 455/562

(58) Field of Search ............................... 455/132, 133, 455/134, 135, 422, 426, 553, 556, 562, 82, 455/88, 551, 552.1, 550.1

(56) References Cited

U.S. PATENT DOCUMENTS

| | | | | |
|---|---|---|---|---|
| 4,101,836 | A * | 7/1978 | Craig et al. | 455/277.1 |
| 4,761,822 | A * | 8/1988 | Maile | 455/82 |
| 4,989,230 | A * | 1/1991 | Gillig et al. | 455/552 |
| 5,442,680 | A * | 8/1995 | Schellinger et al. | 455/426 |
| 5,564,076 | A * | 10/1996 | Auvray | 455/76 |
| 5,737,703 | A * | 4/1998 | Byrne | 455/442 |
| 5,841,971 | A * | 11/1998 | Longginou et al. | 709/200 |
| 5,887,020 | A * | 3/1999 | Smith et al. | 375/130 |
| 5,995,065 | A * | 11/1999 | Kitchener et al. | 343/895 |
| 6,006,113 | A * | 12/1999 | Meredith | 455/561 |
| 6,085,109 | A * | 7/2000 | Koga | 455/552 |
| 6,140,966 | A * | 10/2000 | Pankinaho | 343/700 MS |
| 6,141,560 | A * | 10/2000 | Gillig et al. | 455/550 |
| 6,246,675 | B1 * | 6/2001 | Beasley et al. | 370/342 |
| 6,324,409 | B1 * | 11/2001 | Shaffer et al. | 455/552 |
| 6,341,219 | B1 * | 1/2002 | Poirier et al. | 455/116 |
| 6,351,653 | B1 * | 2/2002 | Alberth et al. | 455/552 |
| 6,366,778 | B1 * | 4/2002 | Bender et al. | 455/442 |
| 6,373,430 | B1 * | 4/2002 | Beason et al. | 342/357.09 |
| 6,480,211 | B1 * | 11/2002 | Masri | 345/857 |
| 6,510,310 | B1 * | 1/2003 | Muralidharan | 455/83 |
| 6,535,733 | B1 * | 3/2003 | Matusevich et al. | 455/424 |
| 6,560,443 | B1 * | 5/2003 | Vaisanen et al. | 455/73 |
| 6,606,311 | B1 * | 8/2003 | Wang et al. | 370/338 |
| 6,738,439 | B1 * | 5/2004 | Okanoue et al. | 375/347 |

OTHER PUBLICATIONS

"3rd Generation Partnership Project; Technical Specification Group Radio Access Network; Multiplexing and channel coding (FDD) (Release 5)", 3GPP TS 25.212 V5.3.0 (Dec. 2002) Technical Specification, 5 pages.

"3rd Generation Partnership Project; Technical Specification Group Radio Access Network; Services provided by the physical layer (Release 5)", 3GPP TS 25.302 V5.6.0 (Sep. 2003) Technical Specification, 7 pages.

* cited by examiner

*Primary Examiner*—William Trost
*Assistant Examiner*—James D. Ewart
(74) *Attorney, Agent, or Firm*—Roland K. Bowler, II

(57) ABSTRACT

A multi-mode wireless communications device (100) and methods therefor, including a first transceiver having a continuous reception mode receiver coupled to a first antenna (138) and a second transceiver having a second transmitter coupled to a second antenna (140). In one mode of operation, the continuous reception mode receiver receives an uncompressed downlink signal at the same time the other receiver receives a signal. In another mode of operation, the continuous reception mode receiver receives an uncompressed downlink signal at the same time a transmitter of the second transceiver transmits a signal. In another mode of operation, a continuous reception mode transmitter of the first transceiver transmits an uplink signal at the same time the other receiver receives a signal.

21 Claims, 2 Drawing Sheets

MULTI-MODE MOBILE COMMUNICATIONS DEVICE WITH CONTINUOUS MODE TRANSCEIVER AND METHODS THEREFOR

FIELD OF THE INVENTIONS

The present inventions relate generally to multi-mode mobile wireless communications, and more particularly to multi-mode communications devices having at least one continuous reception mode operating simultaneously with another mode, and methods therefor.

BACKGROUND OF THE INVENTIONS

The recent emergence of $3^{rd}$ Generation and higher mobile wireless communications systems creates a need for mobile communications handsets capable of accessing multiple communications systems, for example GSM and W-CDMA communications systems serving a common geographical area.

The full exploitation of the services of multiple communication systems requires that multi-mode wireless mobile communications devices operate simultaneously on more than one communication system and transition efficiently therebetween without significant performance degradation.

Multi-mode and multi-band wireless communications handsets are known, but presently these known devices are incapable of accessing more than one communication system simultaneously. In homogeneous communications systems with sufficient frequency separation, for example, Time Division Multiple Access (TDMA) systems, multi-band communication handsets are capable of efficiently assessing handoff candidates on another frequency. The continuous receive and transmit nature of CDMA communications, however, leaves no time for monitoring other communication systems as required for multi-mode operation, for example for assessing hand-off candidates.

It is known to compress the transmission of downlink and uplink information in continuous receive and transmit communications systems to create time for monitoring other communication systems. During compression, more data is transmitted over shorter time intervals to avoid a reduction in the data rate. Transmission compression however requires more power, resulting in increased burdens on system capacity.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
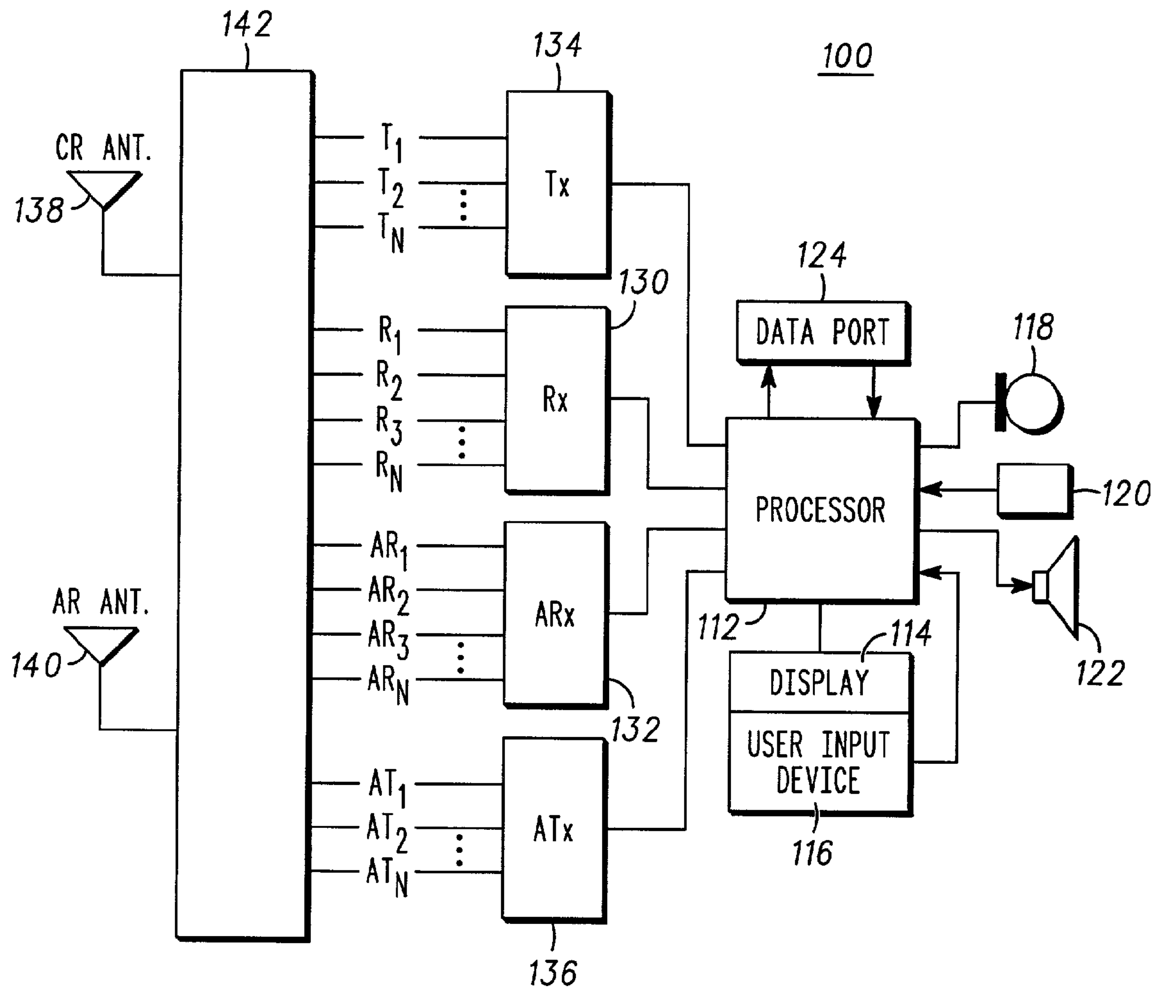
FIG. 1 is a wireless mobile communications device according to an exemplary embodiment of the invention.

FIG. 1 is an exemplary multi-mode wireless communications device 100, for example a cellular communications handset, or a two-way pager, or a wireless communications enabled personal digital assistant, or wireless communications enabled portable or laptop computer.

The device 100 comprises generally a processor 112 having a display 114, a user input device 116, for example a keyboard or a keypad, and other input/output devices, for example a microphone 118, in some embodiments a video input device 120, a speaker 122 and/or speaker output port, and in some embodiments input/output data ports 124.

The communication device 100 also comprises at least two transceivers, each having a corresponding receiver and transmitter, wherein at least one of the receivers on the device is a continuous reception mode receiver. The continuous reception mode receiver is, for example, a CDMA receiver, a W-CDMA receiver a CDMA 2000 receiver, or an AMPS receiver, or some other spread spectrum receiver.

In the exemplary embodiment of FIG. 1, the communications device 100 includes a first receiver 130 having a plurality of receiver inputs $R_1, R_2, R_3 \ldots R_N$, and a second receiver 132 having a plurality of receiver inputs $AR_1, AR_2, AR_3 \ldots AR_N$. The communications device also includes a first transmitter 134 having a plurality of outputs $T_1, T_2 \ldots T_N$, and a second transmitter 136 having a plurality of transmitter outputs $AT_1, AT_2 \ldots AT_N$. At least two of the receivers each have a corresponding transmitter, although in some embodiments there also may be receivers and/or transmitters without a counterpart transmitter or receiver, for example a Global Position System (GPS) receiver, or an emergency locating transmitter.

The receiver inputs of the receivers 130, 132 and the transmitter outputs of the transmitters 134, 136 are coupled either to a first antenna 138 or to a second antenna 140, for example by an interface device 142, which may be controlled by the processor 112.

In one embodiment, the continuous reception mode receiver is coupled to one antenna and the other receiver, which may or may not be a continuous reception mode receiver, is coupled to another, different antenna. In one mode of operation, the continuous reception mode receiver is capable of receiving signals at the same time that the other receiver receives signals. In one embodiment, the other receiver is a continuous reception mode receiver, for example a CDMA receiver, or alternatively the other receiver may be some other type of receiver, for example a TDMA receiver.

Figure 2:
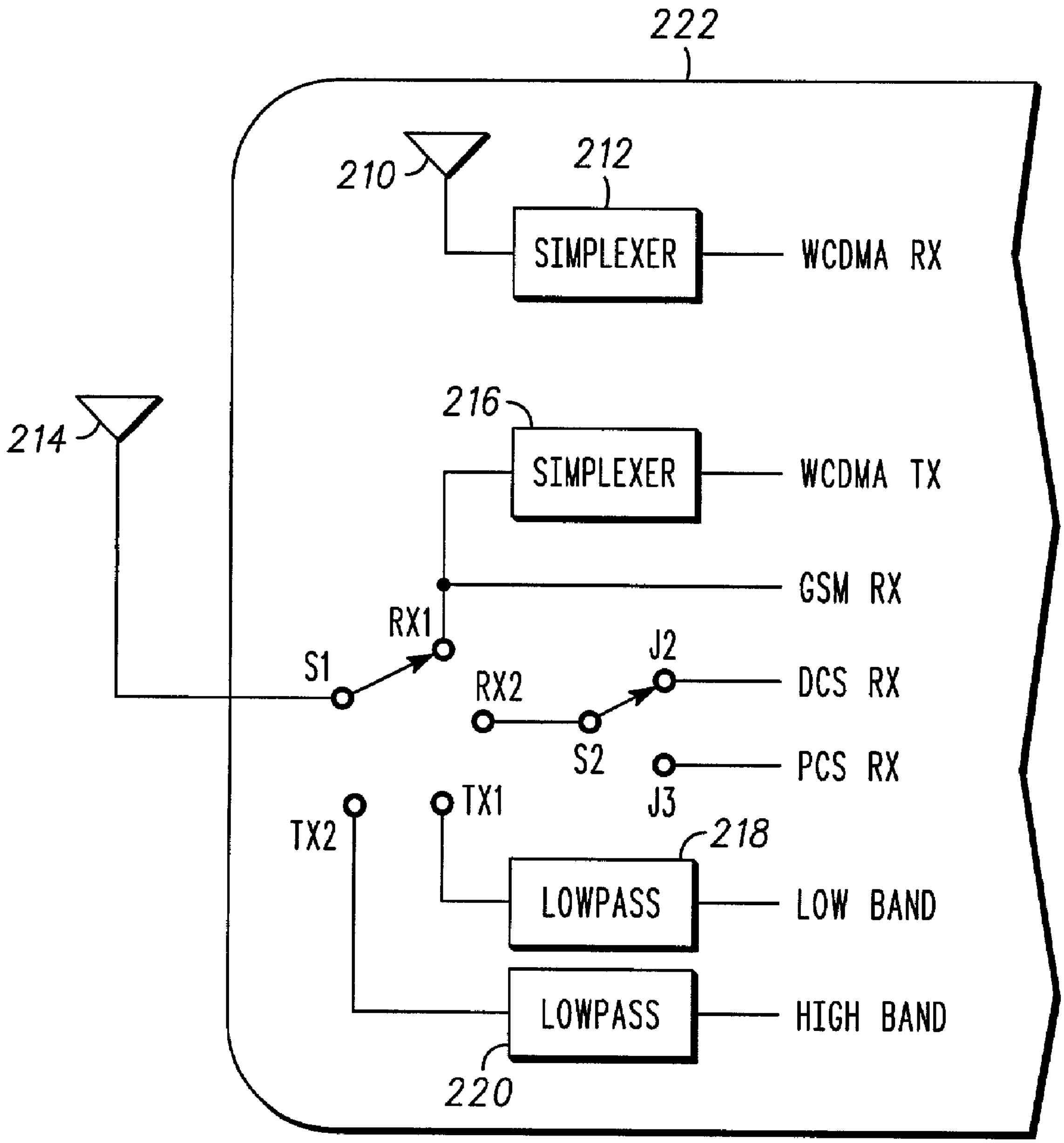
FIG. 2 is an exemplary transceiver input/output interface.

FIG. 2 illustrates an exemplary interface circuit for a multi-mode and multi-band communications device that operates in W-CDMA and multi-band GSM modes. The continuous reception mode WCDMA receiver input WCDMA-$R_x$ is coupled to a first antenna 210 by a simplexer 212, which includes a filter. In the exemplary embodiment, the first antenna 210 is an internal antenna, disposed entirely within a wireless communication handset housing 222. In other embodiments, however, the first antenna may be an external antenna.

In the exemplary embodiment where the first antenna is an internal antenna, the WCDMA transmitter output WCDMA-$T_x$ is coupled to a second antenna 214, which is an external antenna, by a corresponding simplexer 216. In other embodiments, however, the WCDMA transmitter WCDMA-$T_X$ may be also coupled to the first antenna 210 with the WCDMA receiver WCDMA-$R_X$ and the first antenna 210 may be an external antenna.

In the exemplary embodiment of FIG. 2, at least the GSM receiver is coupled to the second antenna 214. Generally, the GSM transmitter may be coupled to either one of the first or second antennas. In FIG. 2, the GSM transceiver is a multi-band device coupled to the second antenna by a switch for transmitting in receiver in multi-bands. Particularly, in FIG. 2, the GSM-$R_X$ band input is coupled with the WCDMA transmitter output WCDMA-$T_X$ to the second antenna 214 by a first switch $S_1$ in an $R_{X1}$ position. The GSM multi-band receiver inputs DCS-$R_X$ and PCS-$R_X$ are alternately connectable to the second antenna 214 by the first switch $S_1$ in an $R_{X2}$ position and by a series second switch $S_2$ switchable between $J_2$ and $J_3$ positions. The GSM multi-band transmitter outputs LOW BAND, HIGH BAND and corresponding first and second low pass filters 218 and 220, respectively, are alternately connectable to the second antenna 214 by the first switch $S_1$, which is switchable between $T_{X1}$ and $T_{X2}$ positions, respectively. The inventions are not limited to first and second transceivers, but may include many transceivers, as indicated by FIG. 2.

In one mode of operation, a first signal is received with the first receiver of the first transceiver operating in a continuous reception mode, and a second signal is received with a second receiver of the second transceiver at the same time the first receiver is receiving the first signal.

In a related receive mode of operation, the first signal is an uncompressed downlink signal received by the first receiver operating in the continuous reception mode, and the second signal is received by the second receiver operating in a non-continuous reception mode at the same time the first receiver is receiving the uncompressed downlink signal. In one application, the multi-mode communications device operates in CDMA and TDMA communications systems, for example WCDMA and GSM systems, wherein the CDMA receiver receives the uncompressed downlink and the TDMA receiver simultaneously receives the second signal.

In another related receive/receive mode of operation, the both of the first and second receivers are continuous mode receivers, for example CDMA receivers, wherein the first receiver receives a first uncompressed downlink signal and the second receiver simultaneously receives a second uncompressed downlink signal.

In another mode of operation, a first signal is received by a first receiver operating in a continuous reception mode, and a second signal is transmitted by a second transmitter at the same time the first receiver is receiving the first signal.

In a related receive/transmit mode of operation, the first signal is an uncompressed downlink signal received by the first receiver operating in the continuous reception mode, and the second signal is transmitted by the second transmitter operating in a non-continuous reception mode at the same time the first receiver is receiving the uncompressed downlink signal. In one application, the multi-mode communications device operates in CDMA and TDMA communications systems, for example WCDMA and GSM systems, wherein the CDMA receiver receives the uncompressed downlink and the TDMA transmitter simultaneously transmits the second signal. In some embodiments, the TDMA transceiver is a multi-band transceiver capable of transmitting in all bands at same time the CDMA receiver receives the uncompressed downlink signal.

In another mode of operation, a first signal is transmitted with the first transmitter of the first transceiver operating in a continuous transmission mode, and a second signal is received by a second receiver of the second transceiver at the same time the first transmitter is transmitting the first signal.

In a related transmit/receive mode of operation, a compressed uplink signal is transmitted with a first transmitter operating in a continuous transmit mode, and the second signal is received with the second receiver at the same time the first transmitter transmits the uncompressed uplink first signal. In one application, the first transmitter is a CDMA transmitter and the second receiver is a TDMA receiver, for example a multi-mode GSM transceiver capable of receiver in PCS and DCS bands and transmitting in high and low bands.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A wireless communication handset, comprising:
- a first transceiver having a first receiver and a first transmitter;
- a first antenna coupled to the first receiver;
- a second transceiver having a second receiver and a second transmitter;
- a second antenna coupled to the second receiver,
- the first and second transmitters connectable at the same time to the same one of either of the first and second antennas.

2. The wireless communication handset of claim 1, the first and second transmitters disconnectable form the same one of the first and second antennas.

3. The wireless communication handset of claim 1, the first receiver is a CDMA receiver, the first transmitter is a CDMA transmitter, the second receiver is a TDMA receiver, the second transmitter is a TDMA transmitter.

4. The wireless communication handset of claim 1, the first antenna is an internal antenna, the first transmitter coupled to the second antenna, the second antenna is an external antenna.

5. The wireless communication handset of claim 1, a switch coupling the first receiver and second transmitters and the second receiver to the same one of the first and the second antennas.

6. The wireless communication handset of claim 1, a processor coupled to the first and second transceivers, a display and input/outputs coupled to the processor.

7. A method in a wireless communications handset having a first transceiver and a second transceiver, comprising:
- receiving an uncompressed CDMA signal with a first receiver of the first transceiver;
- receiving a second signal with a second receiver of the second transceiver at the same time the first receiver is receiving the uncompressed CDMA signal.

8. The method of claim 7,
- receiving the second signal with the second receiver operating in a non-continuous reception mode at the same time the first receiver is receiving the uncompressed CDMA signal.

9. The method of claim 7,
- the first receiver is CDMA receiver, the second receiver is a GSM receiver,
- receiving a downlink signal with the GSM receiver at the same time the CDMA receiver is receiving the uncompressed CDMA signal.

10. The method of claim 7,
- the first receiver is CDMA receiver, the second receiver is a TDMA receiver,
- receiving a downlink signal with the TDMA receiver at the same time the CDMA receiver is receiving the uncompressed CDMA signal.

11. The method of claim 7,
- receiving a second uncompressed downlink signal with the second receiver operating in a continuous reception mode at the same time the first receiver is receiving the uncompressed CDMA signal.

12. The method of claim 7, the first receiver coupled to a first antenna, the second receiver coupled to a second antenna different than the first antenna, the first transceiver includes a first transmitter, the second transceiver includes a second transmitter, connecting the first transmitter and the second transmitter to the same one of the first and second antennas at the same time.

13. A method in a wireless communications handset having a first transceiver, the method comprising:

receiving a first signal with a first receiver of the first transceiver, the first receiver coupled to a first antenna;

transmitting a second signal with a first transmitter of the first transceiver at the same time the first receiver is receiving the first signal, the first transmitter coupled to a second antenna different than the first antenna, receiving the first signal with the first receiver includes receiving an uncompressed CDMA downlink signal.

14. A method in a wireless communications device having a first transceiver and a second transceiver, comprising:

transmitting a first signal with a first transmitter of the first transceiver operating in a continuous spread spectrum transmission mode, the first transmitter coupled to a first antenna;

receiving a second signal with a second receiver of the second transceiver at the same time the first transmitter is transmitting the first signal, the second receiver coupled to a second antenna different than the first antenna.

15. The method of claim 14, the first transmitter is CDMA transmitter, the second receiver is a TDMA receiver, transmitting an uplink signal with the CDMA transmitter;

receiving the second signal with the TDMA receiver at the same time the CDMA transmitter is transmitting the uplink signal.

16. The method of claim 14, transmitting an uncompressed uplink signal with a first transmitter operating in a continuous transmit mode;

receiving the second signal with the second receiver at the same time the first transmitter is transmitting the uncompressed uplink first signal.

17. The method of claim 14, the first transmitter is CDMA transmitter, the second receiver is a TDMA receiver, transmitting an uncompressed uplink signal with the CDMA transmitter;

receiving the second signal with the TDMA receiver at the same time the CDMA transmitter is transmitting the uncompressed uplink signal.

18. A method in a wireless communications device having a first transceiver and a second transceiver, the method comprising:

transmitting with a first transmitter of the first transceiver;

transmitting with a second transmitter of the second transceiver at the same time that the first transmitter is transmitting;

receiving with one of a first receiver of the first transceiver and a second receiver of the second transceiver at the same time the first and second transmitters are transmitting.

19. The method of claim 18, receiving includes receiving an uncompressed continuous signal.

20. A method in a wireless communications device having a first transceiver and a second transceiver, the method comprising:

receiving with a first receiver of the first transceiver;

receiving with a second receiver of the second transceiver at the same time that the first receiver is receiving;

transmitting with one of a first transmitter of the first transceiver and a second transmitter of the second transceiver at the same time the first and second receivers are receiving.

21. The method of claim 20, receiving includes receiving an uncompressed continuous signal.

* * * * *